Figure 1:
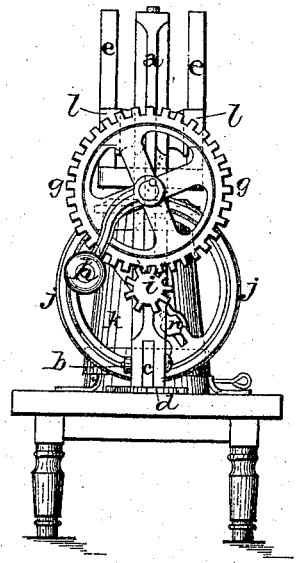
Figure 2:
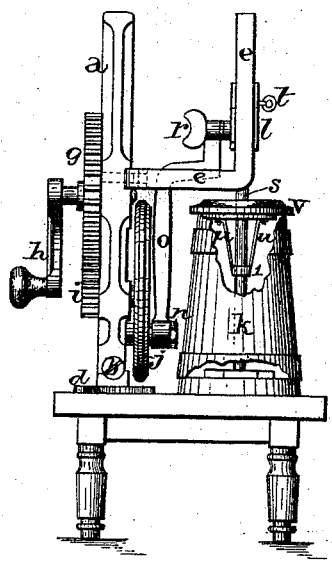
Figure 3:
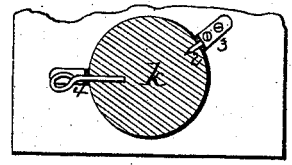

R. P. LISTON.
CHURN.

No. 182,373. Patented Sept. 19, 1876.

WITNESSES:
Wm Garner
F. M. Burnham

INVENTOR:
R. P. Liston
per
F. A. Lehmann, Atty.

UNITED STATES PATENT OFFICE.

RICHARD P. LISTON, OF SELMA, ILLINOIS.

IMPROVEMENT IN CHURNS.

Specification forming part of Letters Patent No. 182,373, dated September 19, 1876; application filed August 16, 1876.

*To all whom it may concern:*

Be it known that I, R. P. LISTON, of Selma, in the county of McLean and State of Illinois, have invented certain new and useful Improvements in Churns; and I do hereby declare the following to be a full, clear, and exact description of the invention, such as will enable others skilled in the art to which it pertains to make and use it, reference being had to the accompanying drawings, which form part of this specification.

My invention relates to an improvement in churns; and it consists in the arrangement and combination of devices that will be fully described hereinafter.

The accompanying drawings represent my invention.

$a$ represents a vertical post, which has a socket formed in its lower end to receive a tenon, $c$, on the top of a spider, $d$, which spider is secured to a floor or other suitable base. Passing through the sides of the post $a$ and the tenon $c$ is a bolt, $b$, which secures the two parts together, and allows the post to be detached at will, and the whole mechanism moved out of the way when desired. Recessed into the inner side of the post $a$, at a suitable distance above the floor, and rigidly bolted thereto, is the two-armed guide $e$, which extends horizontally outward a suitable distance, and then turns vertically upward over the center of the churn $k$, for the slide $l$ to reciprocate upon. This guide is made detachable from the post, so that the whole apparatus can be taken apart for transportation. Journaled upon the outer side of this post $a$ is the large gear-wheel $g$, to which is secured the handle $h$, and which wheel meshes with the pinion $i$, placed just below it. The shaft of this pinion passes directly through the post, and has secured to its inner end the large wheel $j$, to which is adjustably secured the wrist-pin $n$.

Loosely attached to both the wrist-pin and the slide $l$ is the connecting-rod $o$, which causes the slide to vertically reciprocate. This rod is fastened to the slide by means of the set-screw $r$, and the slide is fastened to the dasher-rod $s$ by the pin $t$.

Secured to the under side of the churn-cover $v$, by means of the two rods or bands $u$, is a ring, 1, which encircles the dasher-rod $s$, and serves as a scraper, to keep the rod clean and prevent the milk from coming up through the cover.

The churn is fastened to its base by a small pin or stud, 2, which projects through an ear, 3, on one side, and a pin, 4, which passes through a similar ear on the other side.

By this arrangement and combination of parts, it will be readily seen that the mechanism is independent of the churn; that much of the frame-work usually used on these motors is dispensed with, and that the whole machine can be taken apart for transportation.

Having thus described my invention, I claim—

1. The post $a$, having a socket in its end to receive the tenon $c$ on the spider $d$, in combination with the bolt $b$, as set forth.

2. The combination of the post $a$ and detachable two-armed guide or support $e$, constructed as shown and described.

3. The combination of the cover $v$, rods or plates $u$, and ring 1, with the dash-rod $s$, substantially as shown.

In testimony that I claim the foregoing I have hereunto set my hand this 10th day of August, 1876.

RICHARD P. LISTON.

Witnesses:
    JEFFERSON A. DUNNING,
    WILLIAM R. PATTON.